United States Patent [19]
Dauenhauer et al.

[11] Patent Number: 6,023,978
[45] Date of Patent: Feb. 15, 2000

[54] PRESSURE TRANSDUCER WITH ERROR COMPENSATION FROM CROSS-COUPLING OUTPUTS OF TWO SENSORS

[75] Inventors: Dennis Dauenhauer; Dale Dauenhauer, both of Sunnyvale, Calif.; Alexander Breitenbach, Sarstedt, Germany; Herman Erichsen, Holliston, Mass.

[73] Assignee: Honeywell Data Instruments, Inc., Acton, Mass.

[21] Appl. No.: 08/891,046

[22] Filed: Jul. 10, 1997

Related U.S. Application Data

[60] Provisional application No. 60/021,445, Jul. 10, 1996.

[51] Int. Cl.$^7$ .................. G01L 9/04; G01L 9/06
[52] U.S. Cl. .................. 73/720; 73/721; 338/42
[58] Field of Search .................. 73/720, 721, 719; 338/42, 4

[56] References Cited

U.S. PATENT DOCUMENTS

| | | |
|---|---|---|
| 3,739,644 | 6/1973 | Underwood et al. ............ 73/398 |
| 4,287,501 | 9/1981 | Tominaga et al. ............ 73/720 X |
| 4,565,096 | 1/1986 | Knecht . |
| 4,565,097 | 1/1986 | Dimeff . |
| 4,612,811 | 9/1986 | Sarasohn ............ 73/706 |
| 4,625,560 | 12/1986 | Sanders . |
| 4,644,482 | 2/1987 | Juanarena . |
| 4,658,651 | 4/1987 | Le . |
| 4,695,817 | 9/1987 | Kurtz et al. ............ 338/4 |
| 4,817,022 | 3/1989 | Jornod et al. . |
| 4,895,026 | 1/1990 | Tada ............ 73/721 |
| 4,926,674 | 5/1990 | Fossum et al. . |
| 4,945,762 | 8/1990 | Adamic, Jr. ............ 73/862 |
| 5,029,479 | 7/1991 | Bryan ............ 73/721 |
| 5,088,329 | 2/1992 | Sahagen . |
| 5,095,401 | 3/1992 | Savracky et al. . |
| 5,146,788 | 9/1992 | Raynes . |
| 5,177,661 | 1/1993 | Savracky et al. . |
| 5,187,985 | 2/1993 | Nelson . |
| 5,329,818 | 7/1994 | Frick et al. . |
| 5,458,000 | 10/1995 | Burns et al. . |
| 5,460,049 | 10/1995 | Kirsch . |
| 5,471,884 | 12/1995 | Czarnocki et al. ............ 73/720 |
| 5,490,034 | 2/1996 | Zavracky et al. . |
| 5,600,071 | 2/1997 | Sooriakumar et al. ............ 73/721 |

FOREIGN PATENT DOCUMENTS 0 049 955  4/1982  European Pat. Off. .......... G01L 9/06

OTHER PUBLICATIONS

International Search Report from PCT Application No. PCT/US97/11907, filed Jul. 10, 1997.

Patent Abstracts of Japan, vol. 008, No. 125, Jun. 12, 1984 & JP–A–59 030035 (Mitsubishi Electric Corp.).

Primary Examiner—Joseph L. Felber
Attorney, Agent, or Firm—Wolf, Greenfield & Sacks, P.C.

[57] ABSTRACT

A pressure transducer that includes at least two sensors having substantially similar or substantially identical error characteristics, wherein each sensor is arranged to be subjected to an applied pressure and the outputs of the sensors are electrically coupled so that errors associated with one sensor are compensated by errors associated with the other sensor. The sensors may be substantially identical silicon sensors formed in close proximity on the same wafer.

40 Claims, 4 Drawing Sheets

PRESSURE TRANSDUCER WITH ERROR COMPENSATION FROM CROSS-COUPLING OUTPUTS OF TWO SENSORS

CROSS REFERENCE TO RELATED APPLICATIONS

This application claims the benefit of prior filed provisional application number 60/021,445, filed Jul. 10, 1996 and entitled Dual Die Pressure Transducer, which is incorporated herein by reference.

BACKGROUND OF THE INVENTION

1. Field of the Invention

The present invention relates to a pressure transducer, and more particularly to a pressure transducer having error compensation.

2. Discussion of the Related Art

Pressure transducers using strain gauges in a Wheatstone bridge configuration are wellknown in the art. Such pressure transducers are sensitive to various disturbances, such as temperature changes, which, if uncompensated, will cause errors in the pressure reading. Temperature induced errors may be observed as a change in the output of the transducer as temperature varies with zero pressure applied, and as a change in the difference between the full-scale output and the zero pressure output as the temperature varies with full-scale pressure applied. These errors are known as "thermal effect on zero (or offset)" and "thermal effect on span", respectively.

Methods are well-known in the art to compensate for such errors and initially require characterization of the transducer to define any errors. Typically, at least two points from the output signal of the transducer are recorded as temperature is varied over a desired range both with zero pressure applied and with some amount of pressure applied. The pressure applied is typically, but not necessarily, full-scale pressure, and the output is recorded at the same temperature points with zero pressure and with the applied pressure. Based on the output signals, the uncompensated thermal effects are calculated and used to derive the required amount of compensation.

Any of several methods can be used to provide error compensation in a pressure transducer. One common method is to add resistors in series with the bridge supply voltage, and in series with and/or in parallel to the individual bridge resistors. The resistors are chosen based on the particular thermal properties necessary to negate the observed thermal effects, and their values are calculated based on the uncompensated thermal measurements. Error compensation may also be accomplished by laser trimming resistors or thermistors to force voltage changes at the sensor. Another method, known as digital compensation, uses stored data to generate error-correction signals which are added to or subtracted from the uncompensated output of the bridge.

Error compensation to achieve accurate pressure measurements, however, can be a costly and time-consuming process. Frequently, the process of characterizing the transducer, adding compensation, re-characterizing and adjusting the compensation must be repeated several times to obtain the desired accuracy. This can be more difficult with particular transducer designs; for example, in micro-machined silicon sensors with full-scale pressures of 1 inch (1") $H_2O$ or less.

Acceleration and gravity are additional factors that can affect the sensitivity of pressure transducers, particularly for use in low pressure applications due to the relatively high mass of their diaphragms in relation to the small force necessary to deflect them. While acceleration forces may not be a factor in all applications, gravity is omnipresent and can cause transducers to be sensitive to their mounting position. Error compensation for acceleration and gravity typically requires using complex structures that are expensive and difficult to make.

Warm-up errors and drift are also factors that affect the sensitivity of even a well-compensated transducer. Warm-up errors and drift occur when a transducer is first turned on due to a thermal lag between components. This cannot generally be reduced by existing compensation methods, but requires highly stable or closely matched components that can substantially increase the product cost.

It is also known to make a pressure transducer using a thin, silicon chip on which have been formed a number of resistances that function as strain gauges. As the cost of these silicon strain gauges has decreased, it has been suggested to interconnect two of these silicon transistors so that errors associated with one sensor cancel the errors in the other sensor. In particular, U.S. Pat. No. 4,565,097 discloses a pair of interconnected wheatstone bridge sensors. In the '097 patent, the resistances of one sensor are connected in the same portion of the bridge with an opposing element of the other sensor so that offsets and drifts are opposed by and largely cancelled by those of the other sensor. Since the pressure of interest is applied to only one of the sensors in the pair of sensors, however, the pressure transducer produces an output that is not cancelled by the other sensor.

Although the pressure transducer illustrated in the '097 patent may result in the cancellation of temperature effects, drifts, and offsets, it still requires that the errors of each of the sensors that make up the pressure transducer be characterized so that sensors having opposite error effects are paired together. For example, if the first sensor in the pressure transducer has a positive temperature coefficient, the second sensor to be used for cancellation of the positive temperature coefficient should have a negative coefficient so that when the sensors are connected together to form the pressure transducer, the positive and negative temperature coefficients will cancel each other out.

In addition, the '097 patent wires the two sensors together so that the resistors that make up each leg of the wheatstone bridge are placed in series with each other. Due to this series connection of the resistances, the '097 patent requires that the connections between the resistances of the bridge be externally accessible. This can be somewhat inconvenient when working with silicon strain gauges that have already been completely constructed in a particular die. Additionally, the series connection of resistances in the '097 patent requires that the two sensors to be paired together have opposite error characteristics so that the errors will cancel when the bridges are wired together.

SUMMARY OF THE INVENTION

The present invention improves upon the state of the art by providing a pressure transducer that includes at least two sensors having substantially similar or substantially identical error characteristics, wherein each sensor is arranged to be subjected to an applied pressure and the sensors are electrically cross-coupled so that errors associated with one sensor are compensated or substantially cancelled by errors associated with the other sensor.

In an illustrative embodiment, the pressure transducer comprises a pair of sensors having substantially similar or substantially identical error characteristics. Each sensor is arranged to be subjected to a first pressure and a second pressure. The sensors are electrically cross-coupled so that an error in one of the sensors is compensated with a substantially similar or substantially identical error in the other of the sensors.

In another illustrative embodiment, the pressure transducer comprises a first base member, a second base member, and a first sensor and a second sensor having substantially identical error characteristics. The first sensor is disposed on the first base member and the second sensor is disposed on the second base member. The transducer also includes an interface member disposed between the first base member and the second base member to define a first cavity about the first sensor, and a cover disposed on the second base member to define a second cavity about the second sensor. The first and second sensors are fluidly and electrically coupled so that an error in the first sensor is compensated with a substantially identical error in the second sensor.

In a further illustrative embodiment, a method of forming a pressure transducer with error compensation comprises steps of providing a pair of sensors having substantially identical error characteristics, fluidly coupling the sensors so that each sensor is arranged to be subjected to a first pressure and a second pressure, and interconnecting the sensors so that an error in one sensor is compensated with a substantially identical error in the other sensor.

BRIEF DESCRIPTION OF THE DRAWINGS

It should be understood that the drawings are provided for the purpose of illustration only and are not intended to define the limits of the invention. The foregoing and other objects and advantages of the present invention will become apparent with reference to the following detailed description when taken in conjunction with the accompanying drawings in which.

DETAILED DESCRIPTION

A pressure transducer may include two or more pressure sensors having substantially similar or substantially identical error characteristics. The sensors may be electrically interconnected in such a manner that the errors associated with each sensor compensate or cancel one another to provide accurate pressure measurements. Although the error compensation techniques of the invention may theoretically be accomplished with any type of sensor, the pressure transducer preferably uses micro-machined silicon sensors or dies formed on a silicon wafer.

Silicon sensors are small, inexpensive and can be closely matched to provide a high degree of compensation with minimal additional processing. Since error characteristics are predominantly process related, errors tend to be very similar for sensors processed on the same silicon wafer which may contain from several hundred to several thousand sensor die. As the relative position of the sensor die on the wafer become closer to each other, the error characteristics of each die tend to become even more similar. Accordingly, the transducer may use sensors having substantially identical error characteristics simply by choosing sensors that are formed in close proximity to each other on the same wafer. Preferably, sensor die that have been formed adjacent or next to each other on the wafer are chosen to substantially increase the likelihood that they have essentially the same error characteristics. By using sensors that have been formed in close proximity to each other in the arrangement of the invention, error characterization and matching may be advantageously avoided thereby providing an accurate pressure transducer at relatively low cost.

Figure 1:
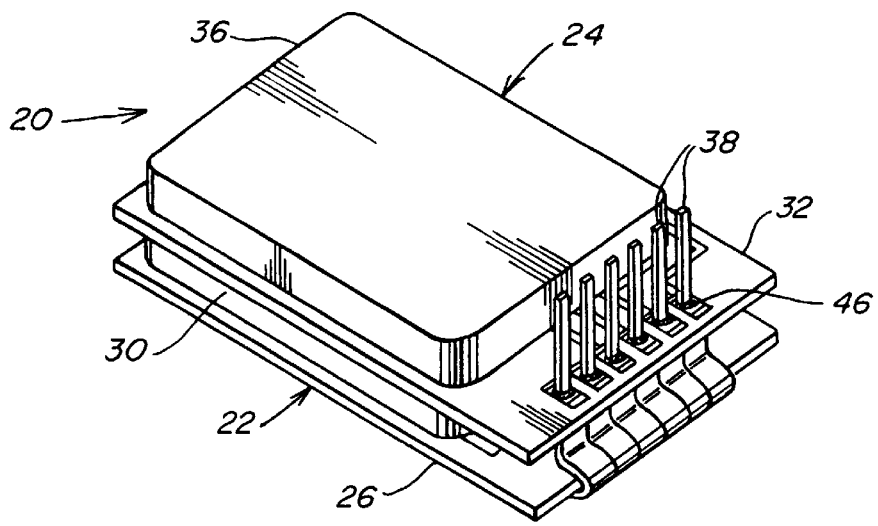
FIG. 1 is a perspective view of an illustrative embodiment of a pressure transducer in accordance with the present invention.
Figure 2:
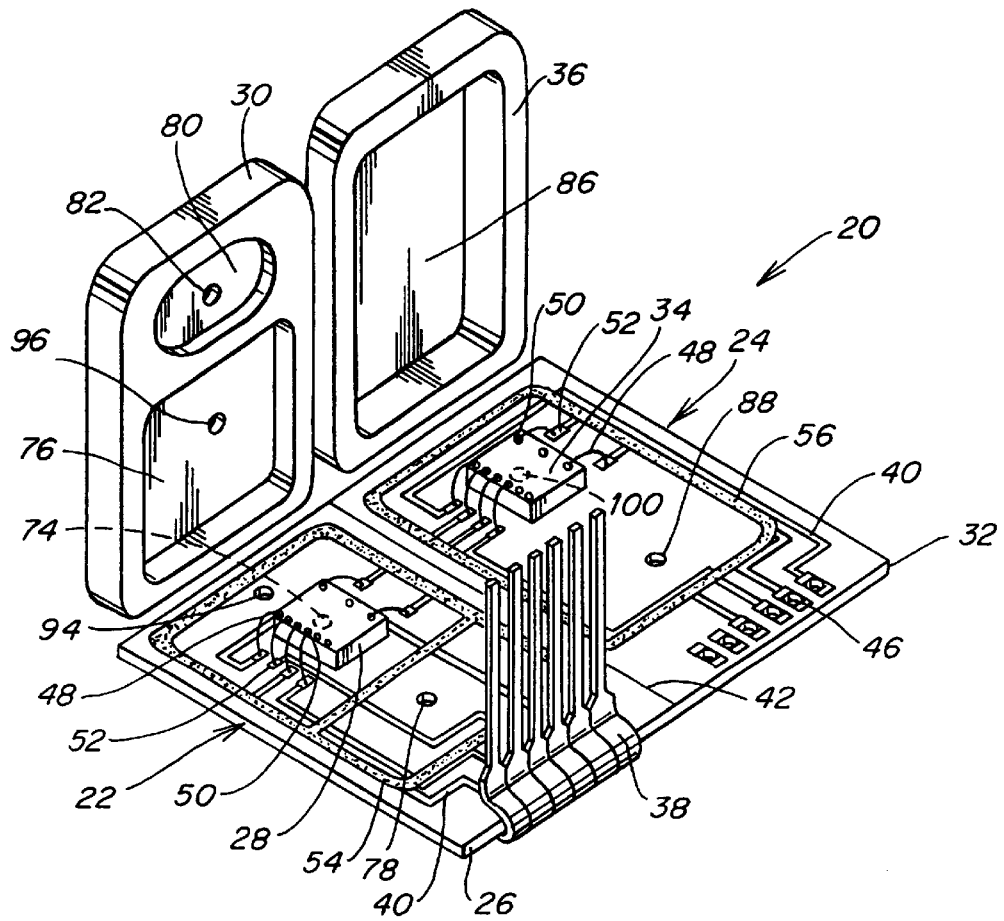
FIG. 2 is a partially exploded perspective view of the sensor modules of the pressure transducer of FIG. 1.
Figure 3:
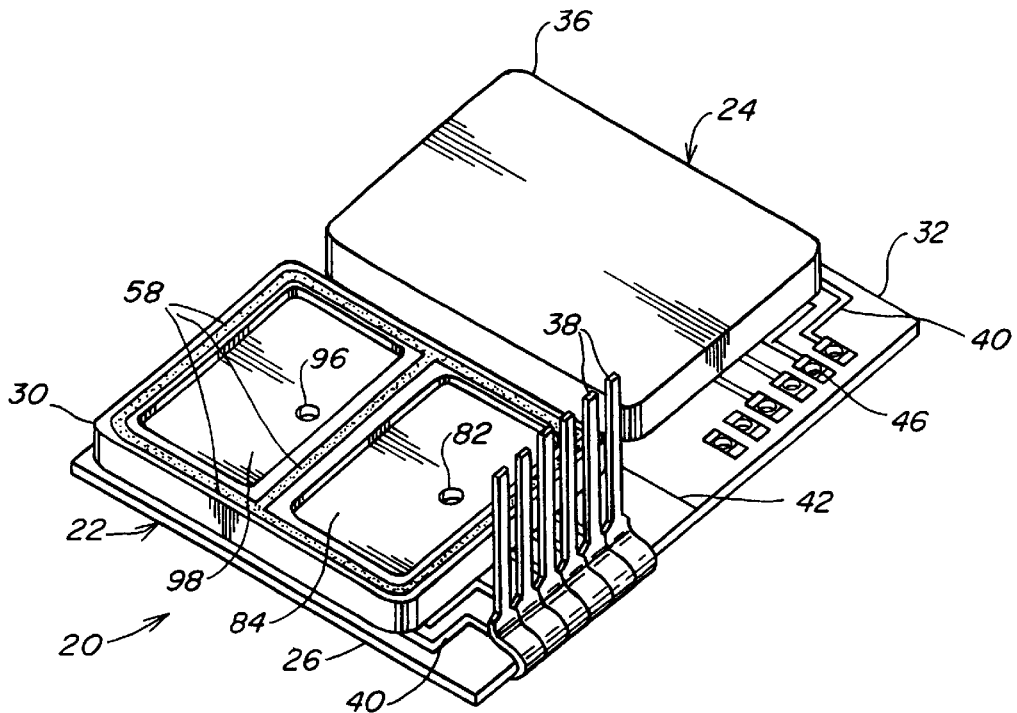
FIG. 3 is a perspective view of the sensor modules for the pressure transducer of FIG. 1 prior to final assembly.

FIGS. 1–3 illustrate one embodiment of a pressure transducer 20 in accordance with the present invention. The pressure transducer 20 may include a first sensor module 22 and a second sensor module 24 that are interconnected in a manner so as to provide an accurate measurement device having error compensation. The second sensor module 24 may be mounted on top of the first sensor module 22 to provide a compact pressure transducer that is easily assembled to establish both the fluid and electrical interconnections.

The first sensor module 22 may include a first base member 26, a first sensor 28, and a first cover 30. Similarly, the second sensor module 24 may include a second base member 32, a second sensor 34, and a second cover 36. Each sensor 28, 34 is mounted on its base member 26, 32 and enclosed with its cover 30, 36 to protect the sensor and also to establish fluid interconnections between the modules. The pressure transducer 20 may also include a plurality of electrical contacts 38 for electrically interconnecting the first and second modules 22, 24 and consequently the first and second sensors 28, 34 which may be electrically coupled to the contacts 38 in a manner apparent to one of skill in the art.

In one embodiment, each base member 26, 32 may be an interconnection device that conveniently establishes the electrical interconnections between the sensors 28, 34 and the electrical contacts 38. As shown in FIG. 2, each base member 26, 32 is preferably a printed circuit board that includes conductive circuitry 40 formed on insulative material using manufacturing methods well known in the art. Each circuit board 26, 32 may include an insulating layer (not shown) for protecting the circuitry 40 and reducing the possibility of electrical shorts between adjacent circuit traces. The use of printed circuit boards significantly enhances the assembly of the transducer at a relatively low cost.

The assembly process of the transducer 20 may be further enhanced by combining the individual circuit boards 26, 32 for the first and second sensor modules 22, 24 in one printed circuit board that includes the circuitry for both the first and second sensor modules. As shown in FIGS. 2 and 3, the first and second sensor modules 22, 24 may be advantageously assembled as a pair, thereby ensuring that the substantially identical first and second sensors 28, 34 remain together during the assembly process. At the final stages of the transducer assembly process, the first and second sensor modules 22, 24 may be separated from each other by splitting the circuit board along a separation line 42 so that the second sensor module 24 may then be mounted to the first sensor module 22 to form the pressure transducer 20 as shown in FIG. 1.

The electrical contacts 38 may be elongated, conductive members having a lower end connected to the circuitry on the first base member 26 and an upper end connected to the circuitry on the second base member 32. In one embodiment, the lower end of each contact 38 may be electrically connected to a circuit pad 44 (FIG. 4) along an edge of the first base member 26. The second base member 32 may include corresponding electrical feedthroughs, such as plated holes 46, that receive the upper end of the electrical contacts 38 therethrough so that the contacts may be electrically connected to the feedthroughs. The electrical contacts 38 may be soldered to the first and second base members 26, 32 to establish the electrical connections between the sensor modules. Each sensor 28, 34 may be electrically connected to the circuitry 40 using conventional techniques, such as wire bonds 48 (FIG. 2) that may be ultrasonically welded between pads 50 on the sensor and pads 52 on the circuitry. It should be understood that other electrical interconnection techniques may be used as would be apparent to one of skill in the art.

As will be explained in greater detail later on, the wheatstone bridges that comprise sensors 28 and 34 are connected together in parallel. Thus, the illustrated arrangement of electrical contacts 38, through holes 46 and circuitry 40 is particularly advantageous because it allows the parallel electrical connection between sensors 28 and 34 to be made quickly and easily.

The first and second covers 30, 36 are mounted to their respective base members 26, 32 to enclose and protect the sensors 28, 34. Further, the covers are constructed so as to fluidly interconnect the first and second sensor modules 22, 24 to each other in a desired manner to compensate for process errors in the sensors 28, 34. The covers 30, 36 may include cavities and orifices that communicate with each other and also with orifices in the base members to selectively channel pressure media to the upper and lower sides of the sensors. The covers should be mounted to the base members in a manner that seals the sensor modules against leakage to maintain pressure therein. The covers may be formed from a material such as plastic, metal or the like as would be apparent to one of skill in the art.

In one embodiment, the covers 30, 36 may be bonded to their respective base members 26, 32 using an adhesive material that mechanically secures and fluidly seals the covers to the base members. As shown in FIG. 2, a bead of adhesive 54, 56 may be applied to each base member 26, 32 in a pattern that bonds the lower surfaces of each cover 30, 36 to the base member. Similarly, as shown in FIG. 3, a bead of adhesive 58 may be applied to the upper surface of the first cover 30 to bond the second sensor module 24 to the first sensor module 22 so that the first cover acts as an interface member between the first and second sensor modules. In a like manner, the perimeter of each sensor 28, 34 may be bonded to its respective base member 26, 32 so as to mechanically secure the sensor and fluidly isolate the opposing sides of the sensor from each other. The covers and sensors may be bonded to the base members using an adhesive such as RTV silicone, an epoxy or similar adhesive material as would be apparent to one of skill in the art.

Figure 4:
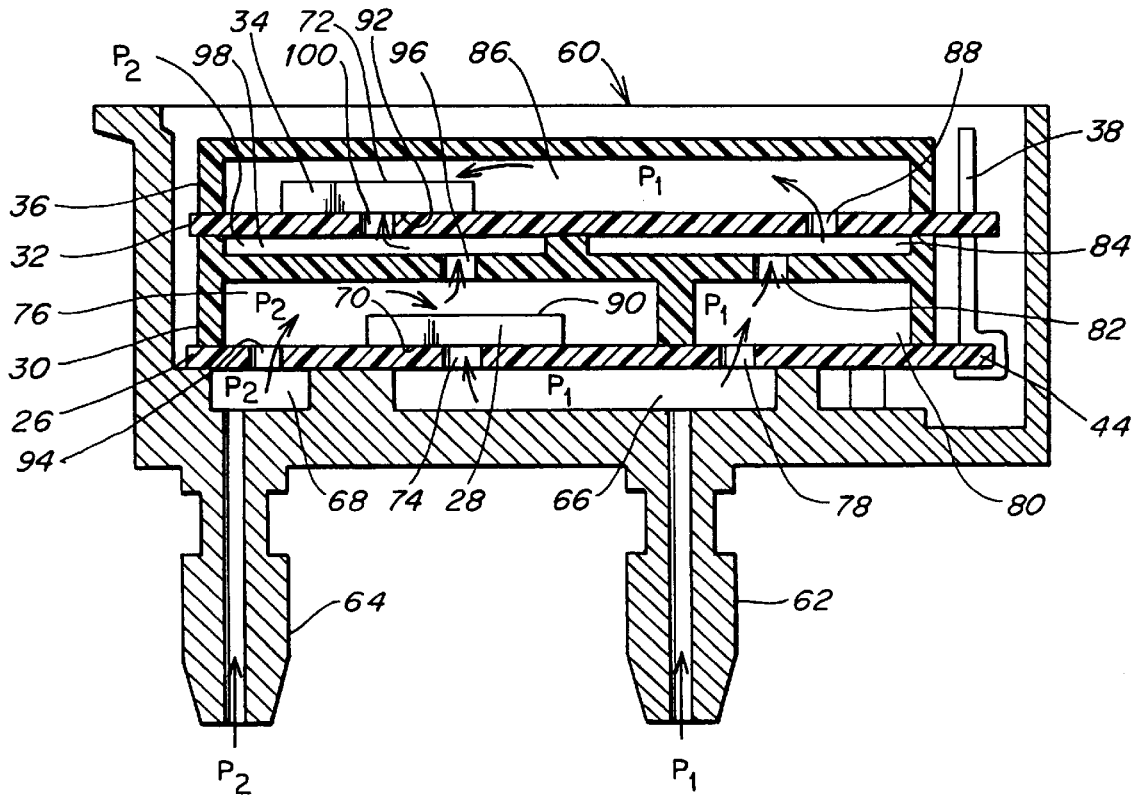
FIG. 4 is a schematic cross-sectional side view of the pressure transducer of FIG. 1 mounted in a housing illustrating one embodiment of the fluid interconnections between the pressure sensors.
Figure 5:
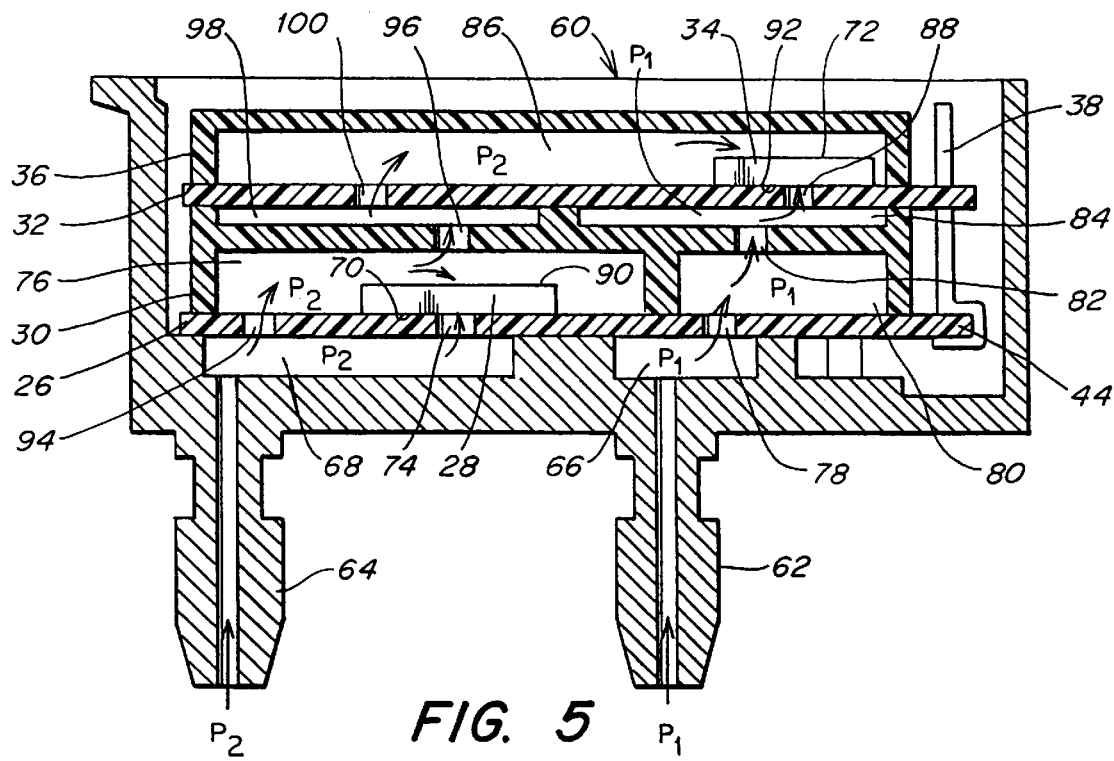
FIG. 5 is a schematic cross-sectional side view of the pressure transducer of FIG. 1 mounted in a housing illustrating another embodiment of the fluid interconnections between the pressure sensors.
Figure 6:
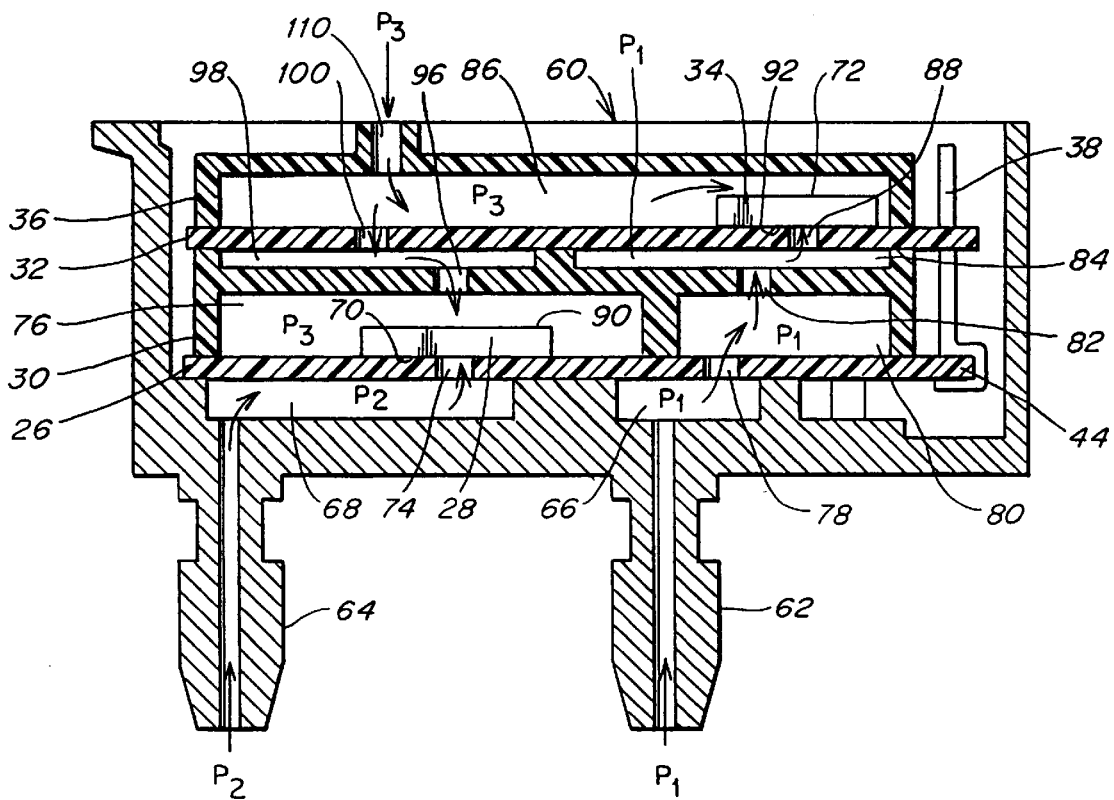
FIG. 6 is a schematic cross-sectional side view of the pressure transducer of FIG. 1 mounted in a housing illustrating another embodiment of the fluid interconnections between the pressure sensors.

As illustrated in FIGS. 4, 5 and 6, the pressure transducer 20 may be mounted in a housing 60 that protects the transducer and allows the transducer to be mounted in a system to be coupled to one or more pressure sources for measuring pressure. The housing 60 may include a first inlet port 62 that may be coupled to a first pressure source and a second inlet port 64 that may be coupled to a second pressure source. The inlet ports 62, 64 may be configured as would be readily apparent to those skilled in the art to provide a fluid connection to the pressure sources. The pressure transducer 20 may be supported on a bottom portion of the housing and secured using an adhesive material that also fluidly seals the transducer to the housing. The bottom portion of the housing may include a first plenum 66 fluidly coupled to the first inlet 62 and a second plenum 68 fluidly coupled to the second inlet 64 to distribute pressurized media to the pressure transducer. The electrical contacts 38 of the transducer may be interconnected to monitoring equipment or the like using wire, a connector or other interconnection device that would be apparent to one of skill in the art.

The covers 30, 36 and the base members 26, 32 of the sensor modules may include cavities and orifices that are configured to distribute the pressurized media to particular sides of the sensors. Each of the silicon die that comprises a sensor has a "inert" side and a "circuitry" side. Since the sensors are formed on silicon substrates, one side, the "circuitry" side will have the various resistors and electrical components formed thereon. The other side, the "inert" or substrate side, will not have any components formed on it. Therefore, the covers 30, 36 and the base members 26, 32 can be arranged so that a particular pressure medium is directed to the inert or circuitry side of the sensor. This can be advantageous in the case of, for example, corrosive fluids that would adversely effect the "circuitry" side of the sensor. The corrosive fluid could instead be directed to the inert side of the sensor thus allowing the pressure to be measured without damaging the sensor itself. This will be explained in more detail in conjunction with the discussion of the embodiments illustrated in FIGS. 5 and 6.

FIG. 4 is a schematic cross-sectional view of the pressure transducer 20 illustrated in FIGS. 1–3 which is configured so that pressure is applied to opposite sides of the sensors and the sensor output signals are subtracted (as will be explained in greater detail later on) to compensate for the errors. As illustrated, the first pressure $P_1$, which is present in the first plenum 66 of the housing, may be distributed to the lower side 70 of the first sensor 28 and the upper side 72 of the second sensor 34 through a combination of orifices and cavities in the base members and first cover. The first base member 26 may include a first orifice 74 disposed below the first sensor 28, which is enclosed by a first cavity 76 in the first cover 30, and a second orifice 78 spaced from the first orifice 74 so that it is not obstructed by the sensor and communicates with a second cavity 80 in the first cover 30. A third orifice 82 may couple the second cavity 80 to a third cavity 84 in the first cover which in turn may be coupled to a fourth cavity 86 in the second cover 36 by a fourth orifice 88 extending through the second base member 32. The fourth orifice 88 is spaced from the second sensor 34, which is enclosed by the fourth cavity 86, so that the first pressure $P_1$ is present in the fourth cavity 86. Accordingly, the first pressure $P_1$ is directed from the first plenum 66 to the lower side 70 of the first sensor 28 and the upper side 72 of the second sensor 34.

As illustrated in FIG. 4, the second pressure $P_2$, which is present in the second plenum 68 of the housing, may be distributed to the upper side 90 of the first sensor 28 and the lower side 92 of the second sensor 34 through a similar combination of orifices and cavities in the base members and first cover. The second plenum 68 may be coupled to the first cavity 76 by a fifth orifice 94 extending through the first base member 26 so that the upper side 90 of the first sensor is subjected to the second pressure $P_2$. A sixth orifice 96 may extend through the first cover 30 to couple the first cavity 76 to a fifth cavity 98 in the first cover. The second base member 32 may include a seventh orifice 100 disposed below the second sensor 34 to couple the lower side 92 of the second sensor to the second pressure $P_2$ that is present in the fifth cavity 98. Accordingly, the second pressure $P_2$ is directed from the second plenum 68 to the upper side 90 of the first sensor 28 and the lower side 92 of the second sensor 34.

FIG. 5 is a schematic cross-sectional view of the pressure transducer 20 illustrated in FIGS. 1–3 which is configured so that sensor 28 acts as a reference sensor and the pressure to be measured is applied to sensor 34. The sensor output signals are subtracted (as will be explained in greater detail later on) to compensate for the errors. As illustrated, this arrangement may be readily achieved by configuring the second sensor module 24 so that the second sensor 34 is mounted to the second base member 32 over the fourth orifice 88 and the fourth cavity 86 is coupled to the fifth cavity 98 by the seventh orifice 100. In addition, housing 60 is reconfigured so that the second pressure $P_2$ (which acts as the reference pressure) in plenum 68 passes through the first orifice 74 to the lower side 70 of sensor 28 and through the fifth orifice 94 into the first cavity 76 and the upper side 90 of sensor 28. In addition, reference pressure $P_2$ passes through the sixth orifice 96 into the fifth cavity 98, through the seventh orifice 100 into the fourth cavity 86 and impinges upon the upper side 72 of sensor 34. Reference pressure $P_2$ may be any pressure but is typically atmospheric pressure.

Pressure $P_1$, the pressure to be measured, is present in plenum 66 and passes through the second orifice 78 into the second cavity 80, through the third orifice 82 into the third cavity 84 and through the fourth orifice 88 to impinge upon the lower side 92 of sensor 34.

FIG. 6 is a schematic cross-sectional view similar to FIG. 4 of a pressure transducer 20 that is configured to provide a differential pressure transducer. As illustrated, this arrangement may be readily achieved by reconfiguring housing 60 and base member 26 from the configuration illustrated in FIG. 5. In the embodiment of FIG. 6, the fifth orifice 94 in base member 26 is closed off. A reference pressure $P_3$ (which may be any pressure but is typically atmospheric pressure) is applied through the eighth orifice 110 into the fourth cavity 86. Reference pressure $P_3$ impinges upon upper side 72 of sensor 34. In addition, reference pressure $P_3$ passes through the seventh orifice 100 into the fifth cavity 98, through the sixth orifice 96 into the first cavity 76 to impinge upon upper side 90 of sensor 28. One pressure to be measured, pressure $P_1$, is introduced into plenum 66 and passes through the second orifice 78 into the second cavity 80. From the second cavity 80, pressure $P_1$ passes through the third orifice 82 into the third cavity 84, through the fourth orifice 88 and impinges on the lower side 92 of sensor 34. Another pressure to be measured, pressure $P_2$, is present in plenum 68 and passes through the first orifice 74 to impinge the lower surface 70 of sensor 28. As will be explained in detail later on, when the outputs of sensors 28 and 34 are subtracted from each other, since reference pressure $P_3$ impinges upon one side of sensors 28 and 34 respectively, the resulting output is the difference between pressures $P_1$ and $P_2$ with the errors between the two sensors being cancelled out.

In order that the errors in sensors 28 and 34 cancel when the outputs are subtracted, the sensors should be oriented so that the pressure of interest impinges upon an inert side of one sensor and a circuitry side of the other sensor. For example, in the embodiment illustrated in FIG. 4, pressure $P_1$ impinges upon the lower side 70 of sensor 28 and the upper side 72 of sensor 34. Therefore, sensors 28 and 34 should be oriented so that side 70 of sensor 28 is the inert side and side 72 of sensor 34 is the circuitry side. Alternatively, sensor 34 could be oriented so that the upper side 72 is the inert side and sensor 28 could be oriented so that the lower side 70 is the circuitry side. The same orientation of sensors as discussed in connection with the embodiment of FIG. 4 is also applicable to the embodiment illustrated in FIG. 5.

In the embodiment illustrated in FIG. 6, wherein a reference pressure $P_3$ (which can be any pressure but is typically atmospheric pressure) is applied to both sensors 28 and 34, the sensors need to be oriented so that reference pressure $P_3$ is applied to an inert side of one sensor and a circuitry side of the second sensor. Therefore, sensor 34 could be oriented so that upper side 72 is the circuitry side and sensor 28 could be oriented so that upper side 90 is the inert side. Alternatively, sensor 34 could be oriented so that the upper side 72 is the inert side and sensor 28 could be oriented so that the upper side 90 is the circuitry side.

The embodiments of the pressure transducer illustrated in FIGS. 5 and 6 are particularly useful for measuring pressure of corrosive fluids. For example, in the embodiment of FIG. 5, if the reference pressure $P_2$ is atmospheric pressure and pressure $P_1$ to be measured is provided by a corrosive fluid, then the inert side of sensor 34 can be oriented so that it is in contact with orifice 88. Thus, the corrosive fluid, since it would impinge upon the inert side of sensor 34, would not adversely affect the circuitry of sensor 34. Furthermore, since sensors 28 and 34 are fluidly isolated from each other than the corrosive fluid would not come in contact with sensor 28.

In a similar manner, with respect to FIG. 6, reference pressure $P_3$ can simply be atmospheric pressure. The circuitry side of sensor 28 can be oriented so that it receives the reference pressure $P_3$. The inert side of sensor 34 can be oriented so that it receives pressure $P_1$. As a result, pressure $P_1$ could be a corrosive fluid and pressure $P_2$ could be a noncorrosive fluid. Thus, the embodiment illustrated in FIG. 6 advantageously allows differential pressure measurement for two fluids where one of the fluids may be a corrosive fluid. Alternatively, the positions of the circuitry side of sensors 28 and 34 could be reversed and pressure $P_2$ could be a corrosive fluid and pressure $P_1$ could be a noncorrosive fluid.

Figure 7:
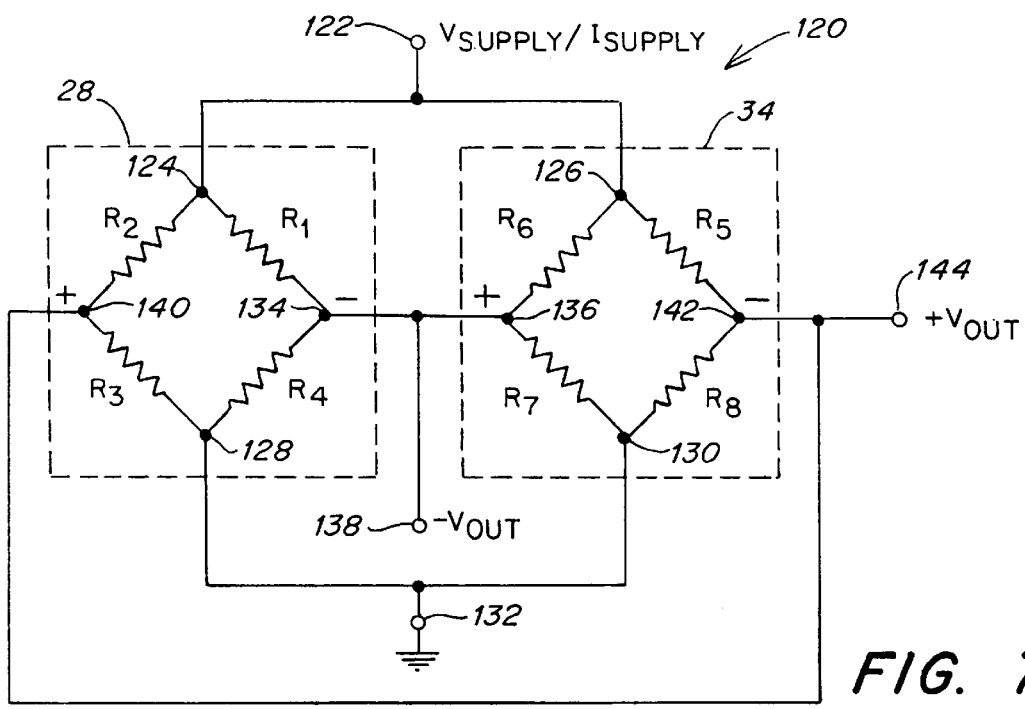
FIG. 7, is a schematic diagram illustrating the electrical connections between the sensors of the pressure transducers illustrated in FIGS. 1–6.

Reference is now made to FIG. 7, which figure illustrates an electrical schematic diagram illustrating how the output and inputs of wheatstone bridge sensors 28 and 34 would be wired together to provide error cancellation. The circuit 120 illustrated in FIG. 7 is the same for all embodiments of the pressure transducer 20 illustrated in FIGS. 1–6. One skilled in the art will appreciate that although particular polarities of the power supply and output signal are illustrated in FIG. 7, the circuit 120 would function in the same manner if all of the polarities were reversed.

In FIG. 7, resistors $R_1$, $R_2$, $R_3$, and $R_4$ form a first wheatstone bridge that comprises sensor 28. Resistors $R_5$, $R_6$, $R_7$, and $R_8$ form a second wheatstone bridge that comprises sensor 34. A voltage or current supply source for circuit 120 is provided at node 122 which supplies nodes 124 and 126 of sensors 28 and 34, respectively. Nodes 128 and 130 are coupled, through node 132, to a reference voltage, which is typically ground. Nodes 134 and 136 are coupled together to provide a $-V_{out}$ output at node 138. Nodes 140 and 142 are connected together at node 144 to provide a $+V_{out}$ output.

As is evident from FIG. 7, the wheatstone bridges that comprise sensors 28 and 34 are connected in a cross-coupled fashion. That is, for the polarities of voltages illustrated, positive output node 140 and negative output node 142 are connected together and negative output node 134 and positive output node 136 are connected together. Thus, since sensors 28 and 34 are selected from, in a preferred embodiment, adjacent sensor die, they will have substantially similar or substantially identical characteristics with respect to changes in their offsets and spans as a result of thermal variations. Since the output nodes of the bridges are cross-coupled so that the outputs will subtract from each other and since both bridges will respond in substantially the same way to thermal variations these errors will tend to cancel each other and the output at $V_{out}$ will be the applied or differential pressure substantially free of these errors.

Figure 8:
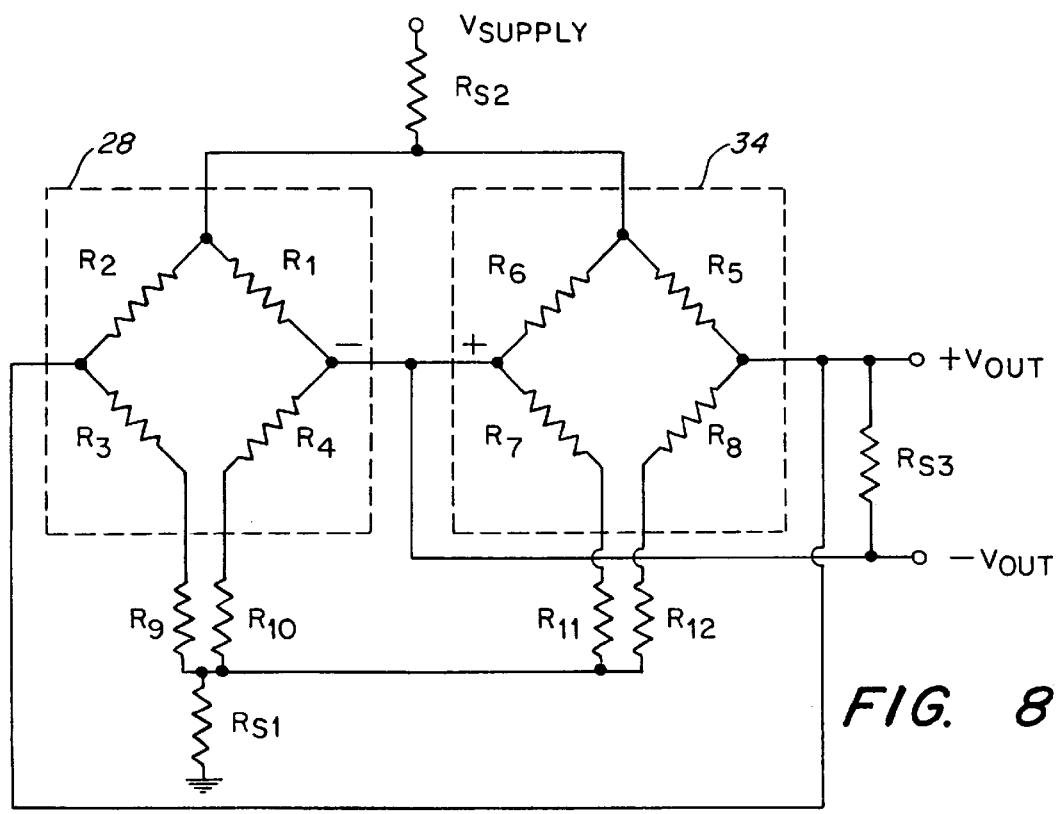
FIG. 8 is a more detailed schematic of the circuit illustrated in FIG. 7.

Reference is now made to FIG. 8, which figure illustrates a more detailed version of the circuit of FIG. 7. In the circuit of FIG. 8, resistors $R_{S1}$, $R_{S2}$, and $R_{S3}$ have been added to allow for adjustment of the sensitivity of the pressure transducer. Resistors $R_{S1}$, $R_{S2}$, and $R_{S3}$ are typically resistors external to the wheatstone bridges themselves. In addition, resistors $R_9$, $R_{10}$, $R_{11}$, and $R_{12}$ have been added to allow for adjustment of the zero point of the transducer. Resistors $R_9$, $R_{10}$, $R_{11}$, and $R_{12}$ are typically external to the wheatstone bridges. Although the circuit illustrated in FIG. 7 does compensate for the vast majority of the error between the two transducers, the circuit of FIG. 8 may be useful in applications where additional accuracy in the transducer output may be necessary.

Since the wheatstone bridges illustrated in FIGS. 7 and 8 are connected so that the outputs are subtracted, an additional benefit of this circuit configuration is that the effects of gravity are substantially eliminated. Thus, any of the embodiments of the present invention can be used for a particular application without requiring compensation for the orientation of the transducer. This allows additional flexibility when incorporating the pressure transducer into a particular installation.

The pressure transducer 20 may be used to measure gauge pressure, differential pressure or absolute pressure as defined by the type of pressure being applied to each side of the sensors. A gauge pressure may be measured when one of the first and second pressures is an applied pressure from a pressure source that is to be measured and the other of the first and second pressures is a reference pressure, typically atmospheric pressure. A differential pressure may be measured when one of the first and second pressures is an applied pressure from a pressure source and the other of the first and second pressures is a different applied pressure from another pressure source. An absolute pressure may be measured when one of the first and second pressures is an applied pressure from a pressure source that is to be measured and the other of the first and second pressures is a vacuum or sealed reference pressure.

The pressure transducer 20 may be useful for measuring pressures from approximately 0.1" (inches) $H_2O$ to approximately 15 psi, and may be particularly suited for measuring pressures of approximately 5 psi or less where pressure transducers tend to be more susceptible to acceleration and gravitational effects. The actual pressure range of the pressure transducer may be limited by the strength of the particular components or material such as the adhesive material used to mount and seal the components to each other. However, it should be understood that the present invention is not to be limited to any particular pressure.

The pressure transducer 20 may be used to measure the pressure of various media such as fluids including gases and liquids as would be apparent to one of skill in the art. For example, the medium may be air, a refrigerant, oil or the like. In some applications, such as with noncorrosive fluids, the sensors may be directly exposed to the medium. However, when the medium is corrosive, it may be additionally desirable to isolate the sensors from direct contact with the medium, particularly the sides of the sensors containing the wiring and circuitry which is generally more susceptible to damage. For example, it may be advantageous to apply a coating of material, such as RTV silicone or the like, to the sensors so that the fluid does not damage the devices. This type of protection may also be desirable for keeping moisture, such as may be present in air, away from the sensors. For more severe applications, it may be desirable to fill the sensor cavities with a nonrigid material, such as RTV silicone or the like, which seals the cavity and will transmit pressure to the sensor. Further, the sensors may be isolated from the pressure medium using bladders, diaphragms or the like.

The pressure transducer 20 of the present invention may be used in a wide range of applications. For example, the transducer may be used to measure pressure, including differential pressure, of coolants in refrigeration systems such as air conditioners, chillers and the like. The transducers may be used to measure oil and hydraulic fluid pressures and the like. The transducers may also be used to monitor various processes. One such application would be to measure the pressure differential across a filter as a means of monitoring when the filter should be replaced as indicated by an increase in the pressure differential. The flow rates of fluids through a system can also be monitored by measuring the pressure differential across the system. It should be understood that these applications are exemplary, and numerous other applications for the transducer are possible and will readily occur to those skilled in the art.

By using sensors in this manner, offset errors that are intrinsic to the basic sensing element including, but not limited to: offset temperature errors, offset warm-up, offset stability, offset thermal hysteresis, offset error due to gravity sensitivity may be compensated. The process involves building devices using at least two sensors in a single device with sensor die from the same silicon wafer, particularly sensor die formed in close proximity to each other. The cost of silicon pressure sensors has become low enough to justify placing two sensor die in a package in lieu of the cost associated with other forms of compensation. This is especially true for applications where the present approach provides accuracies that do not require any temperature testing. The cost associated with having to temperature test and then do other forms of compensation is more expensive than the cost of the additional sensor die.

In those instances where greater accuracy is required, the sensors used in the pressure transducer can be presorted. For example, a simple temperature test can be done on each sensor to determine the direction (or sign) of the thermal effect on zero variations. Zero pressure is applied to the sensor and the temperature is increased. Thereafter, sensors with thermal effect on zero variations that change in the same direction (i.e., have the same sign) can be used as a pair in a pressure transducer since their outputs will be cross-coupled so that the variations in the zero balance subtract. Thus, a very simple and gross temperature sort can be used to provide a very accurate pressure transducer while still avoiding the need for exacting and accurate error characterization of each individual sensor.

From the foregoing description, it will be appreciated that the present invention provides a relatively low cost pressure transducer having error compensation that substantially reduces the effects of process related and other types of errors while substantially eliminating the need for sensor characterization and matching. Error compensation is enhanced using silicon, micro machined pressure sensors from silicon wafers, and is most effective for offset errors associated with silicon wafer processing and the adjunct micro machining technology typically employed to manufacture pressure sensors. Error compensation is also enhanced for offset errors associated with variables such as acceleration or gravity effects, warm-up drift and long term instability that are not easily compensated by characterization and have not had adequate forms of compensation in prior technology, thus limiting the use of silicon sensors.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A pressure transducer comprising:
    a first sensor; and
    a second sensor;
    the first and second sensors having substantially similar error characteristics, each of the first and second sensors being arranged to be subjected to at least one of a first pressure and a second pressure and to provide an output indicative of the pressure exerted thereon, the outputs of the sensors being electrically cross-coupled to each other so that an error in the first sensor is compensated with a substantially similar error in the second sensor.

2. The pressure transducer recited in claim 1, wherein the sensors have substantially identical error characteristics.

3. The pressure transducer recited in claim 1, wherein each sensor is a silicon sensor.

4. The pressure transducer recited in claim 1, wherein each of the first and second sensors includes a first pressure receiving surface and a second pressure receiving surface that are adapted to be subjected to the first and second pressures, the first and second pressure receiving surfaces of the first sensor corresponding to the first and second pressure receiving surfaces of the second sensor, the sensors being arranged so that the first pressure receiving surface of the first sensor and the second pressure receiving surface of the second sensor are to be subjected to the first pressure.

5. The pressure transducer recited in claim 4, wherein the first pressure receiving surface of the first sensor is fluidly coupled to the second pressure receiving surface of the second sensor.

6. The pressure transducer recited in claim 4, wherein the second pressure receiving surface of the first sensor and the first pressure receiving surface of the second sensor are to be subjected to the second pressure.

7. The pressure transducer recited in claim 6, wherein the second pressure receiving surface of the first sensor is fluidly coupled to the receiving surface of the second sensor.

8. The pressure transducer recited in claim 4, wherein the first pressure receiving surface is free of electronic circuitry and the second pressure receiving surface includes electronic circuitry.

9. The pressure transducer recited in claim 1, wherein each of the first and second sensors includes a first pressure receiving surface and a second pressure receiving surface that are adapted to be subjected to the first and second pressures, the first and second pressure receiving surfaces of the first sensor corresponding to the first and second pressure receiving surfaces of the second sensor, the sensors being arranged so that each of the first pressure receiving surface of the first sensor, the second pressure receiving surface of the first sensor and the first pressure receiving surface of the second sensor is to be subjected to the second pressure.

10. The pressure transducer recited in claim 9, wherein the first pressure receiving surface of the first sensor is fluidly coupled to the receiving surface of the second sensor.

11. The pressure transducer recited in claim 9, wherein the first pressure receiving surface is free of electronic circuitry and the second pressure receiving surface includes electronic circuitry.

12. The pressure transducer recited in claim 9, wherein the second pressure receiving surface is free of electronic circuitry and the first pressure receiving surface includes electronic circuitry.

13. The pressure transducer recited in claim 1, wherein each of the first and second sensors includes a first pressure receiving surface and a second pressure receiving surface that are adapted to be subjected to a pressure, the first and second pressure receiving surfaces of the first sensor corresponding to the first and second pressure receiving surfaces of the second sensor, the first pressure receiving surface of the first sensor to be subjected to the first pressure, the second pressure receiving surface of the second sensor to be subjected to the second pressure, the second pressure receiving surface of the first sensor and the first pressure receiving surface of the second sensor to be subjected to a third pressure.

14. The pressure transducer recited in claim 13, wherein the second pressure receiving surface of the first sensor is fluidly coupled to the first pressure receiving surface of the second sensor.

15. The pressure transducer recited in claim 13, wherein the first pressure receiving surface is free of electronic circuitry and the second pressure receiving surface includes electronic circuitry.

16. The pressure transducer recited in claim 1, wherein the first and second sensors include wheatstone bridges.

17. A pressure transducer comprising:
    a first base member;
    a second base member;
    a first sensor and a second sensor having substantially similar error characteristics, the first sensor being disposed on the first base member and the second sensor being disposed on the second base member;
    an interface member disposed between the first base member and the second base member to define a first cavity about the first sensor; and
    a cover disposed on the second base member to define a second cavity about the second sensor;

the first and second sensors being fluidly and electrically coupled so that an error in the first sensor is compensated with a substantially similar error in the second sensor.

18. The pressure transducer recited in claim 17, wherein the sensors have substantially identical error characteristics.

19. The pressure transducer recited in claim 17, wherein each of the first and second base members is an interconnection device.

20. The pressure transducer recited in claim 19, wherein each of the first and second base members is a printed circuit board.

21. The pressure transducer recited in claim 20, wherein each printed circuit board includes electronic circuitry configured to establish electrical interconnections between the first and second sensors.

22. The pressure transducer recited in claim 21, further comprising a plurality of electrical contacts electrically interconnecting the first base member and the second base member.

23. The pressure transducer recited in claim 17, further comprising a plurality of electrical contacts interconnecting the first base member and the second base member.

24. The pressure transducer recited in claim 17, wherein the first and second sensors are substantially identical silicon sensors.

25. The pressure transducer recited in claim 24, wherein each of the first and second sensors includes first and second pressure receiving surfaces, the first and second pressure receiving surfaces of the first sensor corresponding to the first and second pressure receiving surfaces of the second sensor, the interface member fluidly coupling the first pressure receiving surface of the first sensor to the second pressure receiving surface of the second sensor.

26. The pressure transducer recited in claim 24, wherein each of the first and second sensors includes first and second pressure receiving surfaces, the first and second pressure receiving surfaces of the first sensor corresponding to the first and second pressure receiving surfaces of the second sensor, the interface member fluidly coupling the first pressure receiving surface of the first sensor to the first pressure receiving surface of the second sensor.

27. The pressure transducer recited in claim 17, wherein the first and second sensors include wheatstone bridges.

28. The pressure transducer recited in claim 27, wherein the wheatstone bridges have outputs that are electrically cross-coupled.

29. The pressure transducer recited in claim 17, wherein the interface member mechanically couples the first base member and the second base member.

30. The pressure transducer recited in claim 29, wherein the interface member is constructed and arranged to fluidly couple the first sensor to the second sensor.

31. A method of forming a pressure transducer with error compensation, the method comprising steps of:
   (a) selecting first and second sensors having substantially similar characteristics, each sensor providing an output indicative of pressure exerted thereon;
   (b) fluidly coupling the first and second sensors so that each sensor is arranged to be subjected to a first pressure and a second pressure; and
   (c) electrically cross-coupling the outputs of the first and second sensors so that an error in the first sensor is compensated with a substantially similar error in the second sensor.

32. The method recited in claim 31, wherein the first and second sensors are silicon sensors formed on a wafer, and wherein step (a) includes selecting the sensors from the same wafer.

33. The method recited in claim 32, wherein step (a) includes selecting the first and second sensors from sensors formed in close proximity to each other.

34. The method recited in claim 33, wherein step (a) includes selecting the first and second sensors from adjacent sensor die on the wafer.

35. The method recited in claim 31, wherein each of the first and second sensors includes first and second pressure receiving surfaces, the first and second pressure receiving surfaces of the first sensor corresponding to the first and second pressure receiving surfaces of the second sensor, and wherein step (b) includes fluidly coupling the first pressure receiving surface of the first sensor to the second pressure receiving surface of the second sensor.

36. The method recited in claim 35, wherein step (b) further includes fluidly coupling the second pressure receiving surface of the first sensor to the first pressure receiving surface of the second sensor.

37. The method recited in claim 31, wherein each sensor includes a first pressure receiving surface and a second pressure receiving surface, the first and second pressure receiving surfaces of the first sensor corresponding to the first and second pressure receiving surfaces of the second sensor, and wherein step (b) includes fluidly coupling the first pressure receiving surface of the first sensor to the first pressure receiving surface of the second sensor.

38. The method recited in claim 31, wherein step (c) includes subtracting the output signals from each other.

39. The method recited in claim 31, wherein step (a) includes the step of selecting the first and second sensors with substantially identical error characteristics.

40. The method recited in claim 31, wherein step (a) includes the step of testing the first and second sensors and selecting the first and second sensors with similar temperature offset characteristics.

* * * * *